United States Patent
Bulat et al.

(10) Patent No.: US 10,767,556 B2
(45) Date of Patent: Sep. 8, 2020

(54) METHOD AND EQUIPMENT FOR COMBUSTION OF AMMONIA

(71) Applicant: Siemens Aktiengesellschaft, Munich (DE)

(72) Inventors: Ghenadie Bulat, Lincoln (GB); Timothy Hughes, Wantage (GB); Jonathan May, Lincoln (GB); Ian Wilkinson, Witney (GB)

(73) Assignee: Siemens Aktiengesellschaft, Munich (DE)

( * ) Notice: Subject to any disclaimer, the term of this patent is extended or adjusted under 35 U.S.C. 154(b) by 210 days.

(21) Appl. No.: 15/999,280

(22) PCT Filed: Feb. 10, 2017

(86) PCT No.: PCT/EP2017/053036
§ 371 (c)(1),
(2) Date: Aug. 15, 2018

(87) PCT Pub. No.: WO2017/140595
PCT Pub. Date: Aug. 24, 2017

(65) Prior Publication Data
US 2019/0107048 A1 Apr. 11, 2019

(30) Foreign Application Priority Data

Feb. 15, 2016 (GB) .................................. 1602617.1

(51) Int. Cl.
*F02C 3/24* (2006.01)
*F23C 9/06* (2006.01)
(Continued)

(52) U.S. Cl.
CPC ................ *F02C 3/24* (2013.01); *F01K 23/10* (2013.01); *F01K 23/18* (2013.01); *F02C 3/20* (2013.01);
(Continued)

(58) Field of Classification Search
None
See application file for complete search history.

(56) References Cited

U.S. PATENT DOCUMENTS

| 4,910,957 A * | 3/1990 | Moreno .................... F02C 3/14 60/737 |
| 2005/0026095 A1 * | 2/2005 | Fischer .................. F02M 25/00 431/2 |

(Continued)

FOREIGN PATENT DOCUMENTS

| CN | 203375458 U | 1/2014 |
| EP | 2589426 B1 | 6/2016 |

(Continued)

OTHER PUBLICATIONS

Valera-Medina et al. "Ammonia, Methane and Hydrogen for Gas Turbines," 7th International Conference on Applied Energy—ICAE2015, Energy Procedia 75, pp. 118-123 (2015).

(Continued)

*Primary Examiner* — Steven M Sutherland
*Assistant Examiner* — Rodolphe Andre Chabreyrie
(74) *Attorney, Agent, or Firm* — Schiff Hardin LLP

(57) ABSTRACT

A method for the combustion of ammonia, wherein a first combustion chamber receives ammonia and hydrogen in controlled proportions, and an oxygen-containing gas. Combustion of the ammonia and hydrogen produces $NH_2$ ions among other combustion products. A second combustion chamber receives the combustion products from the first combustion chamber and receives further ammonia and further hydrogen in controlled proportions, wherein combustion produces nitrogen oxides among other combustion products. A third combustion chamber receives the nitrogen oxides along with further ammonia and further hydrogen in further controlled proportions along with further oxygen-containing gas, such that the nitrogen oxides are combusted into nitrogen and water.

19 Claims, 4 Drawing Sheets

(51) Int. Cl.
  *F23C 6/04*   (2006.01)
  *F02C 3/20*   (2006.01)
  *F02C 3/34*   (2006.01)
  *F01K 23/10*  (2006.01)
  *F01K 23/18*  (2006.01)
  *F02C 3/22*   (2006.01)
  *F02C 6/04*   (2006.01)

(52) U.S. Cl.
  CPC .............. *F02C 3/22* (2013.01); *F02C 3/34* (2013.01); *F02C 6/04* (2013.01); *F23C 6/04* (2013.01); *F23C 9/06* (2013.01); *F23C 2900/9901* (2013.01); *F23J 2215/10* (2013.01)

(56) References Cited

U.S. PATENT DOCUMENTS

| | | | | |
|---|---|---|---|---|
| 2005/0037244 A1* | 2/2005 | Goetsch | ............... | B01J 23/40 |
| | | | | 423/351 |
| 2009/0133400 A1* | 5/2009 | Callas | ............... | F02C 7/224 |
| | | | | 60/730 |
| 2012/0047870 A1* | 3/2012 | Kasuga | ............... | F02C 3/22 |
| | | | | 60/39.462 |
| 2012/0276463 A1* | 11/2012 | Grannell | ............... | C01B 3/047 |
| | | | | 429/415 |
| 2012/0315586 A1* | 12/2012 | Gard | ............... | F23D 11/38 |
| | | | | 431/11 |
| 2015/0000296 A1* | 1/2015 | Guethe | ............... | F02C 6/18 |
| | | | | 60/772 |
| 2015/0226118 A1* | 8/2015 | Kelly | ............... | F02C 7/22 |
| | | | | 290/52 |
| 2015/0376801 A1* | 12/2015 | Bairamijamal | ......... | C07C 41/01 |
| | | | | 204/257 |

FOREIGN PATENT DOCUMENTS

| | | |
|---|---|---|
| JP | 2012255420 A | 12/2012 |
| JP | 2014185583 A | 10/2014 |
| JP | 2015031215 A | 2/2015 |

OTHER PUBLICATIONS

Notice of Allowance dated Dec. 27, 2019 issued for Korean Patent Application No. 10-2018-7026600.

* cited by examiner

METHOD AND EQUIPMENT FOR COMBUSTION OF AMMONIA

BACKGROUND OF THE INVENTION

Field of the Invention

The present invention provides a system and method for combustion of ammonia which reduces or eliminates the emission of nitrogen oxides $NO_x$.

Description of the Prior Art

Ammonia may be used as an energy storage material. Ammonia may be synthesized and stored for later combustion. Combustion of ammonia in a gas turbine may allow chemically-stored energy to be released into mechanical energy. However, combustion of ammonia produces nitrogen oxides $NO_x$ which should be removed from the exhaust gas in order to reach emission targets.

SUMMARY OF THE INVENTION

In accordance with the invention, in a method and system for the combustion of ammonia, a first combustion chamber receives ammonia and hydrogen in controlled proportions, as well as an oxygen-containing gas. Combustion of the ammonia and hydrogen in the first combustion chamber produces a $NH_2^-$ ions among other combustion products. A second combustion chamber receives the combustion products from the first combustion chamber, and receives further ammonia and further hydrogen in controlled proportions. Combustion in the second combustion chamber produces nitrogen oxides, among other combustion products. A third combustion chamber receives the combustion products of the second combustion chamber, including the nitrogen oxides, along with further ammonia and further hydrogen in further controlled proportions, as well as with further oxygen-containing gas, such that the nitrogen oxides are combusted into nitrogen and water.

DESCRIPTION OF THE PREFERRED EMBODIMENTS

Figure 1:
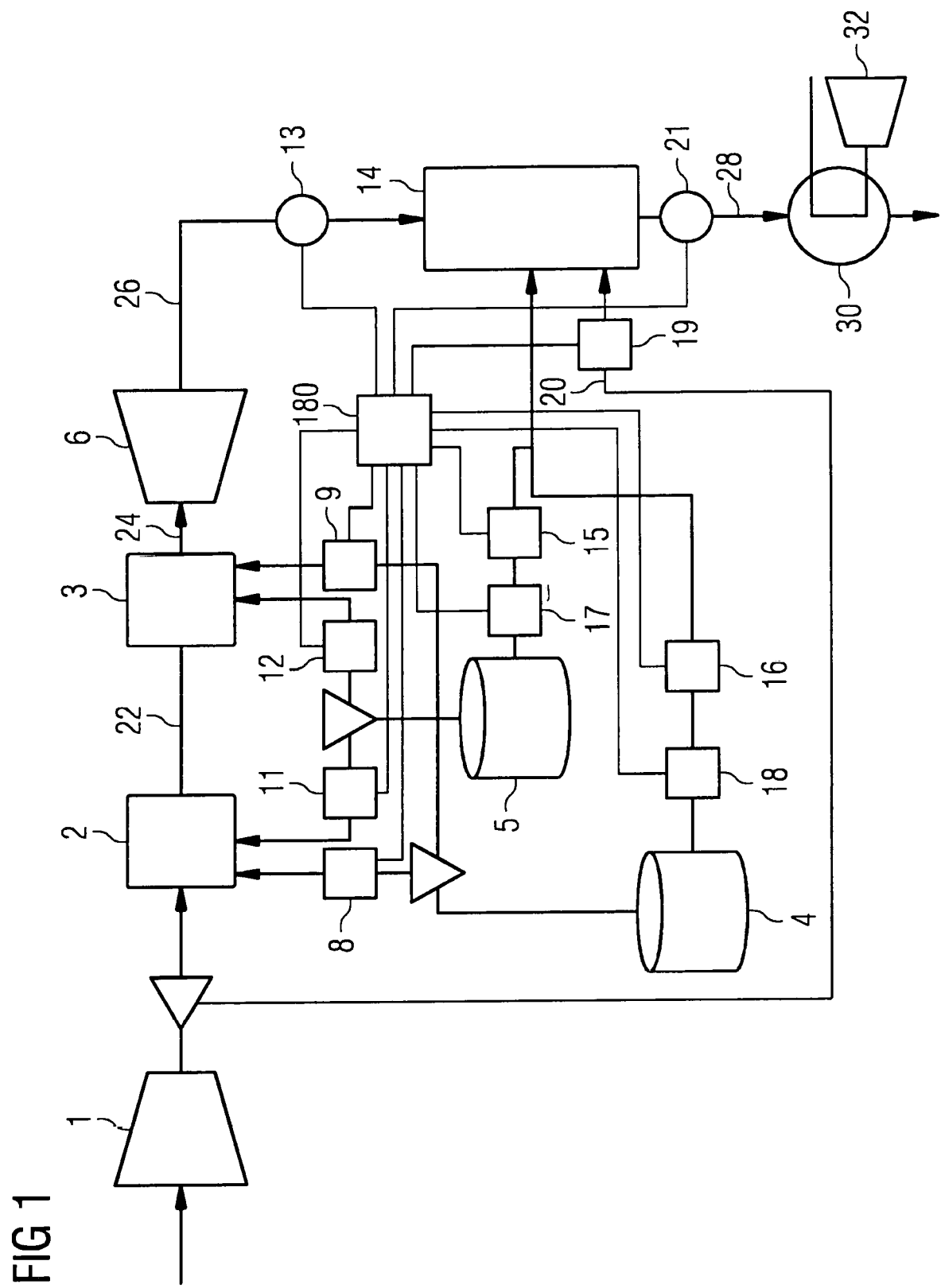
FIGS. 1-4 schematically illustrate respective embodiments of the present invention.

In an embodiment of the invention, illustrated in FIG. 1, an ammonia combustion system includes a compressor 1 that compresses air, or other oxygen-containing gas, and passes the compressed gas into a relatively high-pressure and high-temperature first combustion chamber 2. A first mixture of ammonia 4 and hydrogen 5 is added to the first combustion chamber 2 where combustion takes place producing heat and an exhaust gas flow 22. For example, the operational pressure within the first combustion chamber 2 may lie in the range 8-30 bar, with a typical operational pressure being in the range 12-25 bar. The exit temperature of exhaust gases 22 from the first combustion chamber may be in the range 1400-2100 K, typically 1500-1800 K.

Control of the ratio of ammonia to hydrogen supplied to the first combustion chamber 2 is achieved by a controller 180 through mass flow controllers 8 and 11.

The ammonia is provided at an enhanced equivalence ratio, for example in the range 1.0-1.2. Due to the enhanced equivalence ratio, exhaust gases 22 from the first combustion chamber 2 contain a significant proportion of $NH_2^-$ ions.

The exhaust gases 22 from the first combustion chamber are provided to a second combustion chamber 3 along with additional ammonia 4 and hydrogen 5.

Control of the ratio of ammonia to hydrogen supplied to the second combustion chamber 3 is achieved by the controller 180 through mass flow controllers 9 and 12. The gas mixture is optimized to deliver maximum power upon combustion, as the exhaust gas flow 24 is provided to turbine 6 to produce a mechanical output, such as rotation of a shaft.

For example, the operational pressure within the second combustion chamber 3 may be in the range 10-30 bar, with a typical operational pressure being in the range 12-25 bar. The exit temperature of exhaust gases 24 from the second combustion chamber 3 may be in the range 1400-2100 K, typically 1500-1800 K. The combustion may be performed at a relatively constant pressure, for example the combustion pressure drop may be less than 5% to maintain cycle efficiency, so there is only a small pressure drop over the combustion chamber 3.

However, due to high combustion temperatures, and the high nitrogen content of the ammonia fuel, the exhaust gas flow 24 from the second combustion chamber 3 will have high levels of nitrogen oxides $NO_x$.

Exhaust gas 26 leaving the first turbine 6 is hot and is routed to a third combustion chamber 14 operating in a relatively low pressure and relatively low temperature regime. For example, the operational pressure within the third combustion chamber 14 may be in the range 1-10 bar, with a typical operational pressure being in the range 1-5 bar. The exit temperature of exhaust gases from the third combustion chamber may be in the range 300-1300 K, typically 750-880 K.

Prior to entering this third combustion chamber 14, the exhaust gas 26 containing nitrogen oxides $NO_x$, from the second combustion chamber 3 and turbine 6 may be measured with an in situ gas analysis sensor 13.

A third mixture of ammonia 4 and hydrogen 5, this time with added air 20 is injected into the third combustion chamber 14 with an enhanced equivalence ratio of ammonia, typically 1.0-1.2, that is, an excess of ammonia over that required to react with the supplied hydrogen and oxygen to produce only $N_2$ and $H_2O$. The mixture is combusted. The enhanced equivalence ratio ensures that the combustion produces significant proportion of $NH_2^-$ ions which combine with the nitrogen oxides $NO_x$ in the exhaust gas 26 to produce $N_2$ and H2O thereby removing the $NO_x$ from the exhaust stream 26 and producing an exhaust stream 28 from the third combustion chamber 14 which has a low content of nitrogen oxides $NO_x$.

The exact fuel ratio of ammonia 4 to hydrogen 5 supplied to the third combustion chamber 14 is set by the controller 180 using mass flow devices 17, 18 and mass flow sensors 15, 16 and optionally a mass flow controller 19 for the air or other oxygen-containing gas, in conjunction with an in situ gas analysis sensor 21 to control the ammonia to hydrogen ratio, and optionally also the proportion of oxygen-containing gas such as air, in the gas mixture supplied to the third combustion chamber 14.

The required equivalence ratio is determined by measurement of the input $NO_x$ proportion by gas sensor 13 and by measurement of the output $NO_x$ emissions measured by in situ gas sensor 21. Controller 180 receives data from sensors 13, 21 and issues appropriate commands to mass flow devices 17, 18 and optionally 19. Controller 180 may be the same controller as the controller associated with mass flow devices 8, 9, 11, 12, or may be a separate controller.

Optionally, and in the illustrated embodiment, a heat exchanger 30 may be used to remove waste heat and recover energy from exhaust gases 28 from the third combustion chamber.

In the illustrated example, this may be achieved by recovering heat in heat exchanger 30 and using this to drive a steam turbine 32, although other mechanisms may be provided to recover energy from the waste heat, as appropriate.

Figure 2:
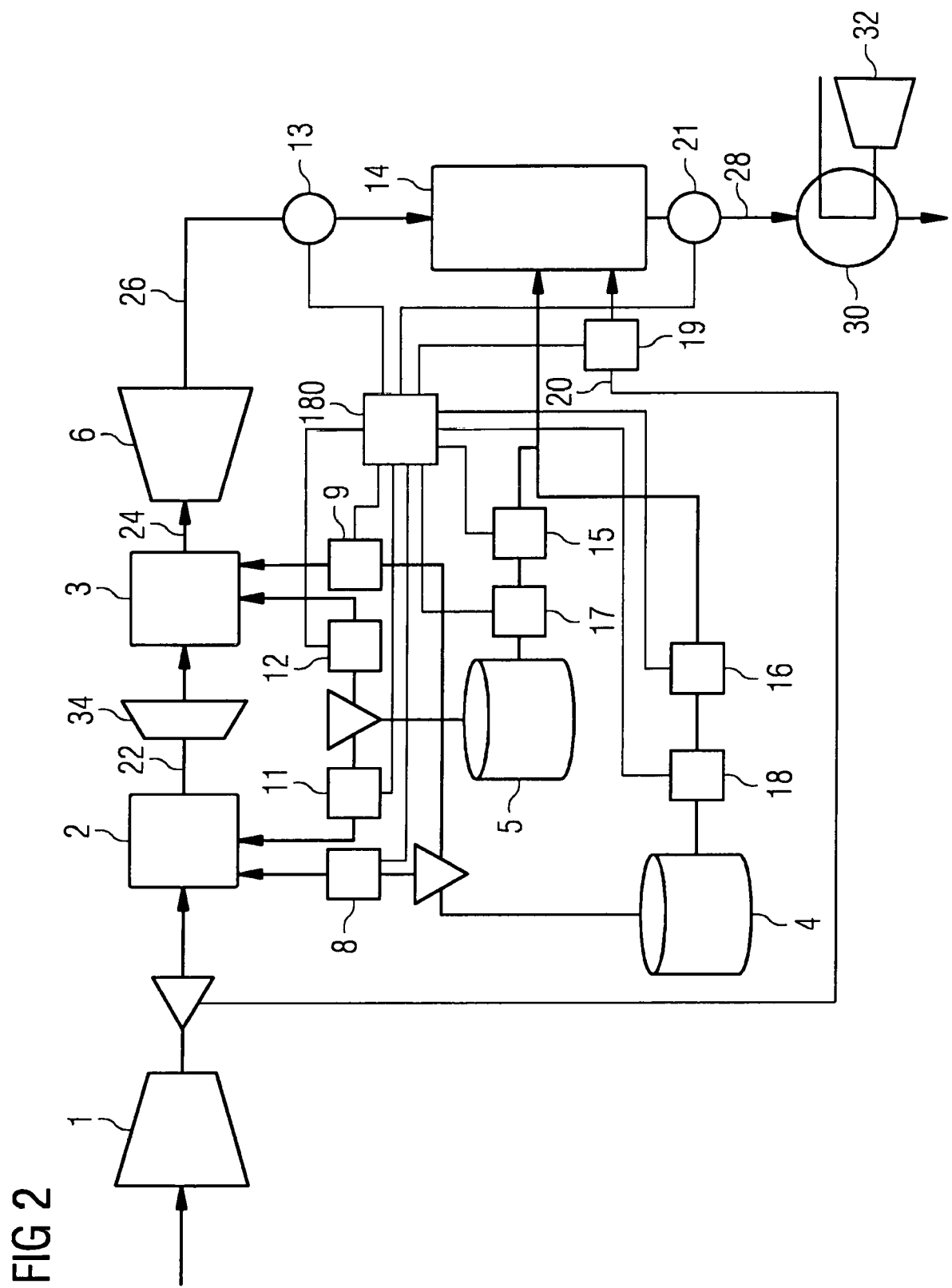

In another embodiment of the present invention, as illustrated in FIG. 2, exhaust gases 22 from the first combustion chamber 2 may be routed through a second turbine 34 to recover waste energy as mechanical rotation.

Figure 3:
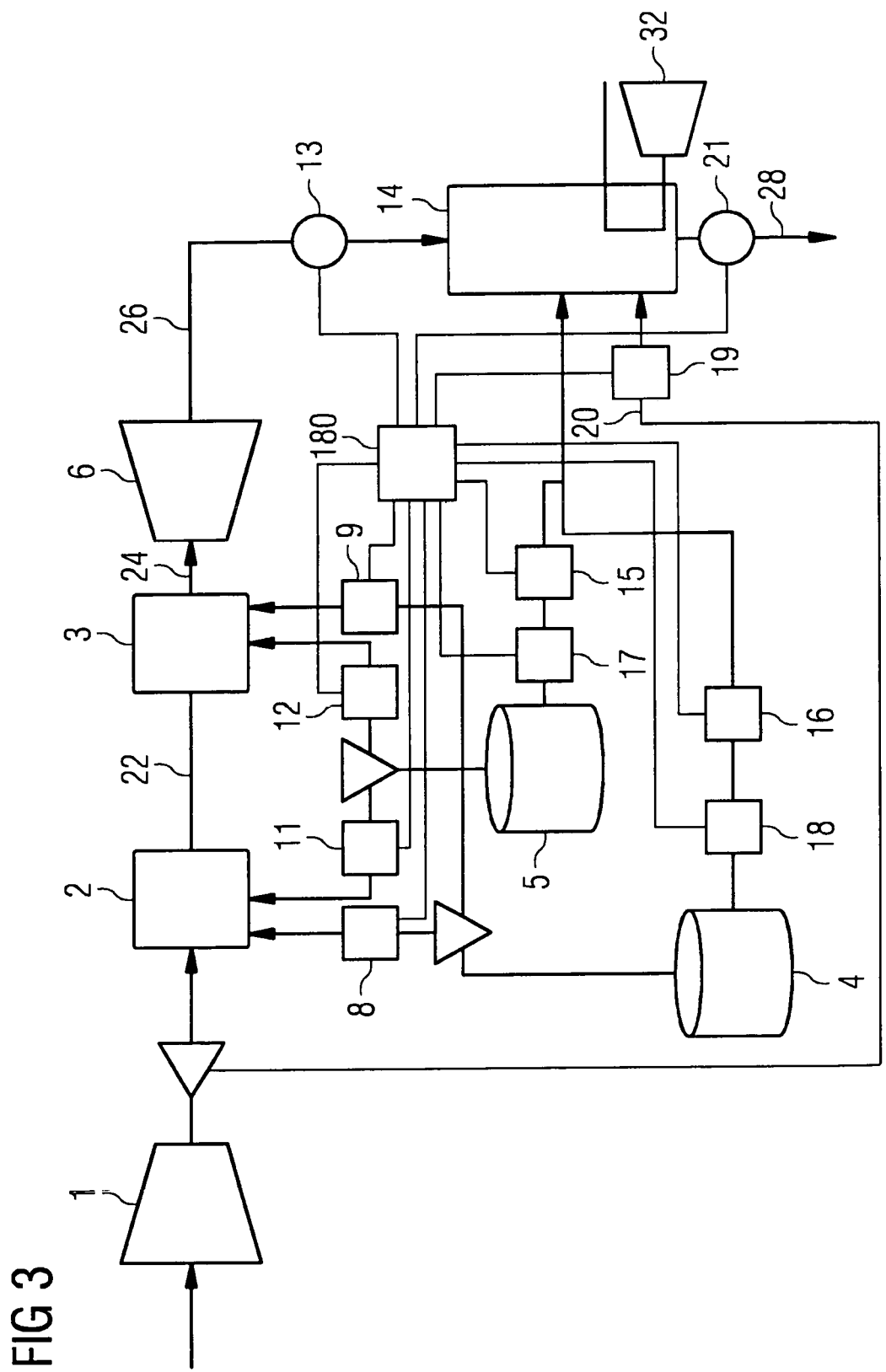

FIG. 3 shows another embodiment of the present invention. In this embodiment, third combustion chamber 14 has an integrated heat exchanger. This may be similar to a heat recovery steam generator with supplementary firing. This may be used to drive steam turbine 32, although other mechanisms may be provided to recover energy from the waste heat, as appropriate.

A heat recovery steam generator (HRSG) is a heat exchanger designed to recover the exhaust 'waste' heat from power generation plant prime movers, such as gas turbines or large reciprocating engines, thus improving overall energy efficiencies. Supplementary (or 'duct') firing uses hot gas turbine exhaust gases as the oxygen source, to provide additional energy to generate more steam if and when required. It is an economically attractive way of increasing system output and flexibility. Supplementary firing can provide extra electrical output at lower capital cost and is suitable for peaking. A burner is usually, but not always, located in the exhaust gas stream leading to the HRSG. Extra oxygen (or air) can be added if necessary. At high ambient temperatures, a small duct burner can supplement gas turbine exhaust energy to maintain the designed throttle flow to the steam turbine.

Figure 4:
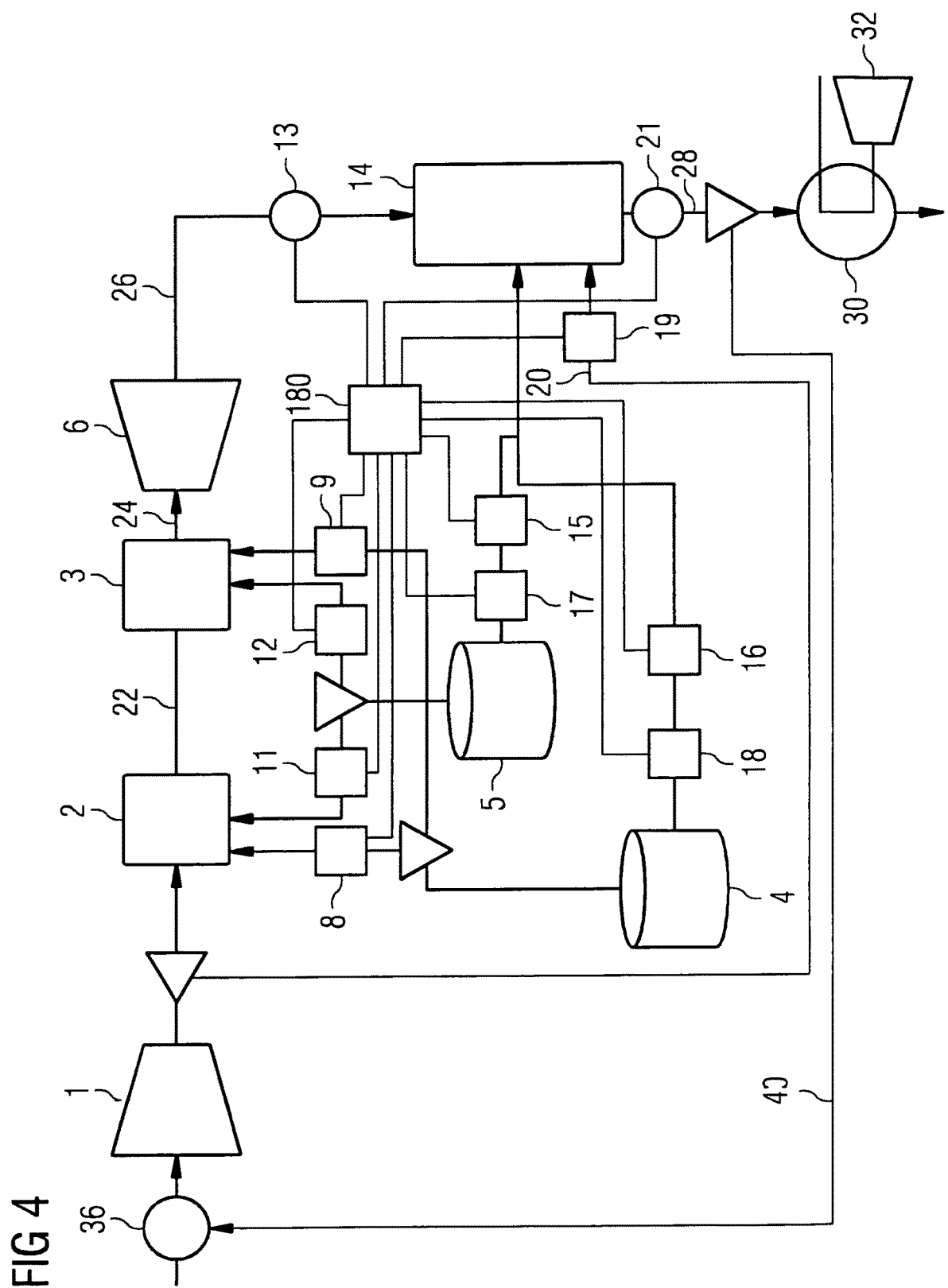

In a further embodiment of the present invention, illustrated in FIG. 4, a recirculation line 40 may be provided to recirculate a proportion of the exhaust gas from the third combustion chamber 14 back into the first combustion chamber 2. The recirculated exhaust gas may be combined with the input gas flow, for example by mixing with intake oxygen-containing gas at mixer 36. This has the advantage that unburnt $NH_3$ in the exhaust gas is recycled and combusted. The proportion of the exhaust gas may be varied, for example between 0% and 80%, depending on the proportion of unburnt $NH_3$ in the exhaust gas from the third combustion chamber, and the acceptable proportion of $NH_3$ in exhaust gases from the system.

The present invention accordingly aims to provide one or more of the following advantages:

(1)—nitrogen oxides $NO_x$ content is reduced or eliminated from the exhaust gases;

(2)—overall efficiency of the system is maximized as all ammonia and hydrogen is converted to energy, nitrogen and water;

(3)—gas mixtures, temperatures and pressures in each of the three combustion chambers may be optimized according to their respective allocated function, providing good overall efficiency of the system;

(4)—the combustion chambers 2, 3, 14 can be located at a different location to the turbine(s) 6, 32, 34 so enabling various possible layouts to suit environmental constraints; and (5)—$NH_3$ content in the exhaust gas is minimized.

The respective technical features that may contribute to the above advantages are as follows.

Use of three combustion chambers 2, 3, 14 enables combustion under appropriate equivalence ratios to allow the formation of $NH_2^-$ ions in the first combustion chamber 2, efficient power generation in the second combustion chamber 3 and effective removal of $NO_x$ in the third combustion chamber. The subsequent combination of $NH_2^-$ ions with $NO_x$ in the exhaust gas to form $N_2$ and $H_2O$ reduces the ammonia content of the exhaust gas.

Measurement 13 of the $NO_x$ content in the exhaust gas 26 from turbine 6 prior to input into the third combustion chamber, control of the $NH_3/H_2$ gas mass flows into each combustion chamber and measurement 21 of the $NO_x$ exhaust gas at the output of the third combustion chamber allow the exact setting of the equivalence ratio according to the $NO_x$ content of each respective exhaust gas 26, 28.

This is necessary because the burn conditions in the first and second combustion chambers 2, 3 will determine the $NO_x$ content of the exhaust gases 26. These conditions can change on a dynamic basis and from system to system.

Use of a heat exchanger 30 minimizes the energy loss associated with the third combustion in the third combustion chamber 14.

Recirculation of exhaust gas from the third combustion chamber 14 back to the first combustion chamber 2 acts to minimize $NH_3$ emissions.

The present invention accordingly provides a method for combustion of ammonia, wherein a first combustion chamber receives ammonia and hydrogen in controlled proportions, and an oxygen-containing gas such as air, wherein combustion of the ammonia and hydrogen is carried out so as to produce $NH_2^-$ ions, among other combustion products. A second combustion chamber receives the $NH_2^-$ ions and other combustion products along with further ammonia and hydrogen in further controlled proportions, and produce's nitrogen oxides, among other combustion products. A third combustion chamber receives the combustion products of the second combustion chamber including nitrogen oxides along with further ammonia and hydrogen in further controlled proportions and further oxygen-containing gas such as air, such that the nitrogen oxides are combusted into nitrogen and water.

Energy from the combustion in the first combustion chamber 2 may be recovered by operation of a turbine 34 to convert the energy released by combustion in the first combustion chamber into mechanical energy.

Energy from the combustion in the second combustion chamber 3 may be recovered by operation of a turbine 6 to convert the energy released by combustion in the second combustion chamber into mechanical energy.

Energy from the combustion in the third combustion chamber 14 may be recovered by operation of a turbine 32 to convert the energy released by combustion in the third combustion chamber 14 into mechanical energy. Operation of the turbine 32 may be by direct action of exhaust gases from the third combustion chamber 14 on the turbine 32, or by heating of water in a heat exchanger 30 to drive third turbine 32 by steam.

The third combustion chamber 14 may incorporate a heat exchanger for recovery of heat from exhaust gases from the third combustion chamber. The heat exchanger may serve to heat steam for the recovery of energy.

A proportion of exhaust gases from the third combustion chamber 14 may be recirculated into the first combustion chamber 2 in order to provide combustion to ammonia remaining in the exhaust gases 28.

Although modifications and changes may be suggested by those skilled in the art, it is the intention of the Applicant to embody within the patent warranted hereon all changes and modifications as reasonably and properly come within the scope of the Applicant's contribution to the art.

The invention claimed is:

1. A method for the combustion of ammonia, wherein a first combustion chamber receives ammonia and hydrogen in controlled proportions, and an oxygen-containing gas, wherein combustion of the ammonia and hydrogen produces $NH_2$ ions among exhaust gases from the first combustion chamber, and wherein a second combustion chamber receives the exhaust oases from the first combustion chamber and receives further ammonia and further hydrogen in controlled proportions, wherein combustion in the second combustion chamber produces nitrogen oxides among exhaust gases from the second combustion chamber, and wherein a third combustion chamber receives the exhaust gases from the second combustion chamber including nitrogen oxides along with further ammonia and further hydrogen in further controlled proportions along with further oxygen-containing gas, such that the nitrogen oxides are combusted into nitrogen and water.

2. The method for the combustion of ammonia according to claim 1 wherein energy from the combustion in the second combustion chamber is recovered by operation of a first turbine by the exhaust gases from the second combustion chamber to convert energy from the combustion in the second combustion chamber into mechanical energy.

3. The method for the combustion of ammonia according to claim 2 wherein energy from the combustion in the first combustion chamber is recovered by operation of a second turbine by the exhaust gases from the first combustion chamber to convert the energy from the combustion in the first combustion chamber into mechanical energy.

4. The method for the combustion of ammonia according to claim 1 wherein energy from the combustion in the third combustion chamber is recovered by operation of a third turbine to convert the energy from the combustion in the third combustion chamber into mechanical energy.

5. The method for the combustion of ammonia according to claim 4 wherein operation of the third turbine is by heating of water in a heat exchanger to drive the third turbine by steam.

6. The method for the combustion of ammonia according to claim 1 wherein heat is recovered from the third combustion chamber by an integrated heat exchanger.

7. The method for the combustion of ammonia according to claim 1 wherein a proportion of exhaust gases from the third combustion chamber is recirculated into the first combustion chamber in order to provide combustion of ammonia remaining in the exhaust gases from the third combustion chamber.

8. A system for the combustion of ammonia, comprising: a first combustion chamber connected to a source of ammonia, to receive ammonia, and connected to a source of hydrogen, to receive hydrogen, in controlled proportions, and connected to a source of oxygen-containing gas, to receive an oxygen-containing gas; a second combustion chamber connected to the first combustion chamber to receive exhaust gases from the first combustion chamber, and connected to the source of ammonia to receive further and connected to the source of hydrogen to receive further hydrogen in further controlled proportions; and a third combustion chamber connected to the second combustion chamber to receive exhaust gases from the second combustion chamber, and connected to the source of ammonia to receive further ammonia and, and connected to the source of hydrogen to receive further hydrogen in further controlled proportions, and connected to the source of oxygen-containing gas to receive further oxygen-containing gas.

9. The system according to claim 8, further comprising a first turbine connected to receive the exhaust gases from the second combustion chamber, to generate a mechanical output and to provide the exhaust gases from the second combustion chamber to the third combustion chamber.

10. The system according to claim 3 further comprising a second turbine connected to receive the exhaust gases from the first combustion chamber and to provide the exhaust gases from the first combustion chamber to the second combustion chamber.

11. The system according to claim 10 further comprising a third turbine connected to a heat exchanger which is connected to receive exhaust gases from the third combustion chamber, whereby to heat water and generate steam to drive the third turbine.

12. The system according to claim 11 wherein the heat exchanger is integrated into the third combustion chamber.

13. The system for the combustion of, ammonia according to claim 8, further comprising a recirculation line arranged to recirculate a portion of exhaust gas from the third combustion chamber back into the first combustion chamber.

14. The system for the combustion of ammonia according to claim 13 wherein the recirculation line is connected to a mixer to mix the proportion of the exhaust gas the third combustion chamber with the oxygen-containing gas.

15. The system for the combustion of ammonia according to claim 8 the source of hydrogen is a single source connected to any two of said first combustion chamber, said second combustion chamber, and said third combustion chamber.

16. The system for the combustion of ammonia according to claim 8 wherein, the source of hydrogen is a single source connected to all of said first combustion chamber, said second combustion chamber, and said third combustion chamber.

17. The system for the combustion of ammonia according to claim 8 wherein, the source of oxygen-containing gas is a single source connected to both of said first combustion chamber and said third combustion chamber.

18. The system for the combustion of ammonia according to claim 8 wherein, the source of ammonia is a single source connected to any two of said first combustion chamber, said second combustion chamber and said third combustion chamber.

19. The system for the combustion of ammonia, according to claim 8 wherein, the source of ammonia is a single source connected to all of said first combustion chamber, said second combustion chamber, and said third combustion chamber.

* * * * *